United States Patent Office 3,214,505
Patented Oct. 26, 1965

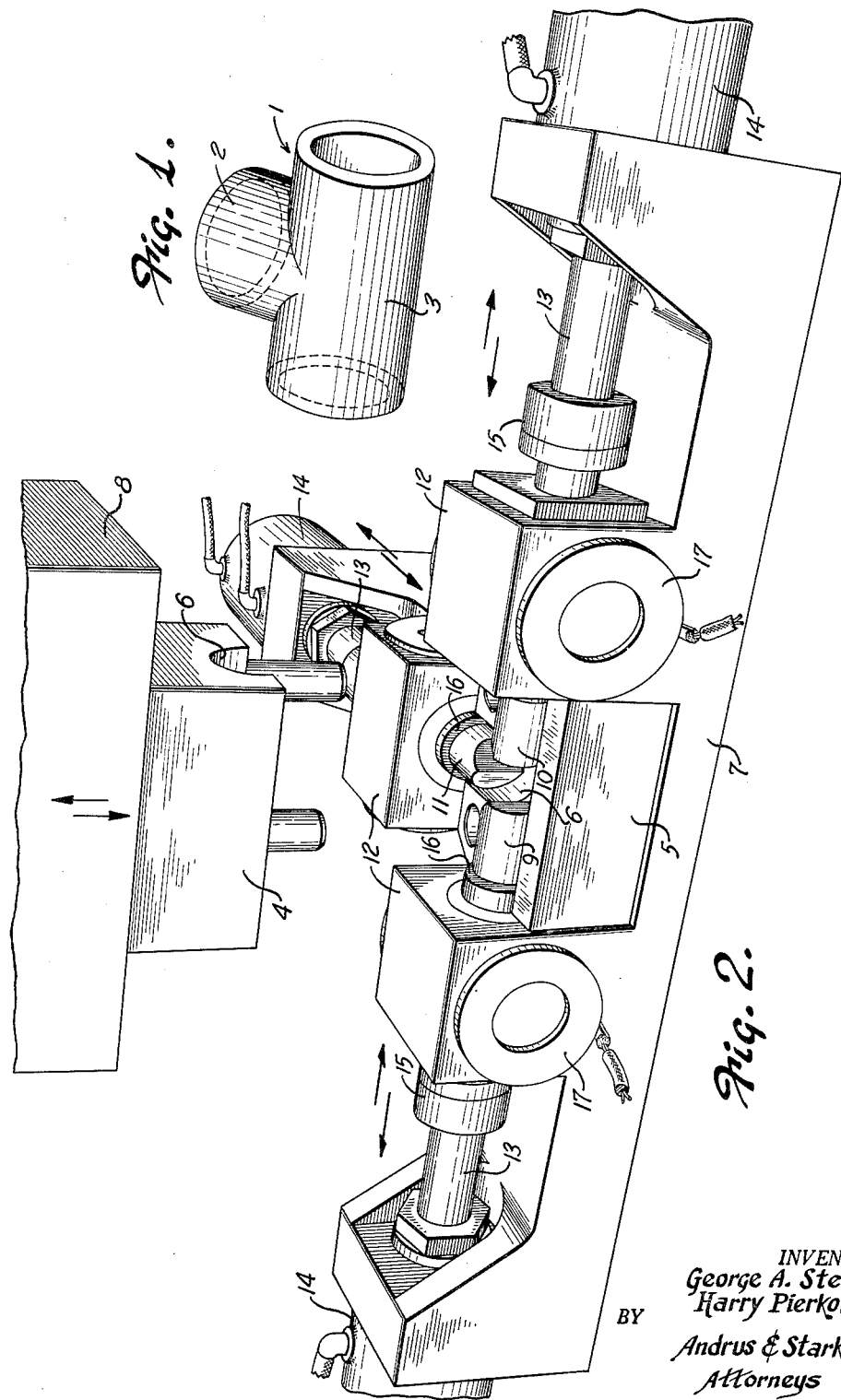

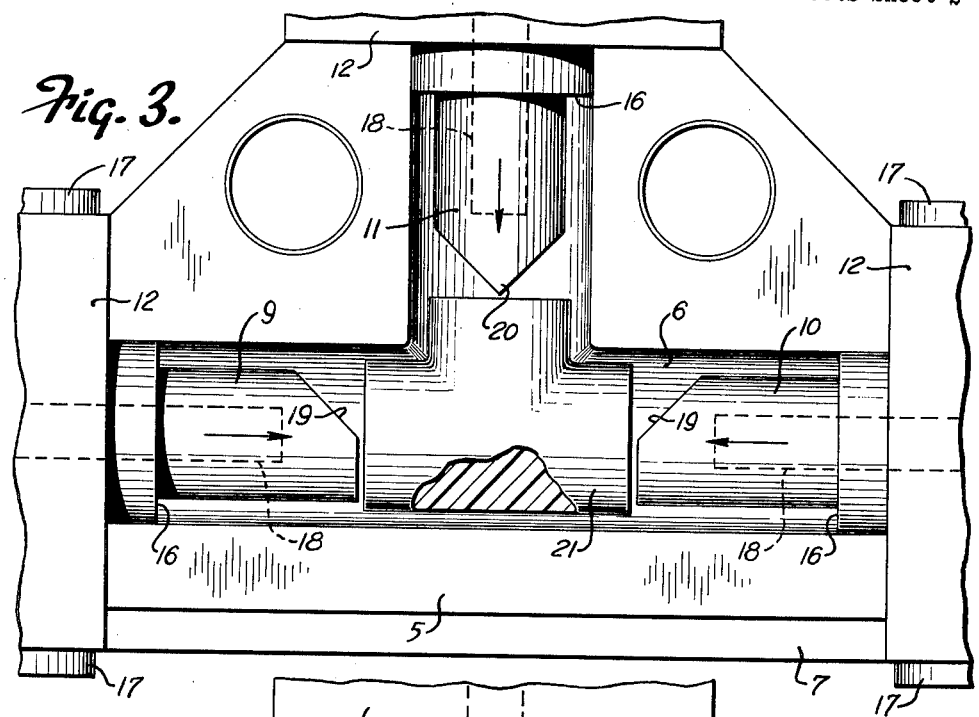
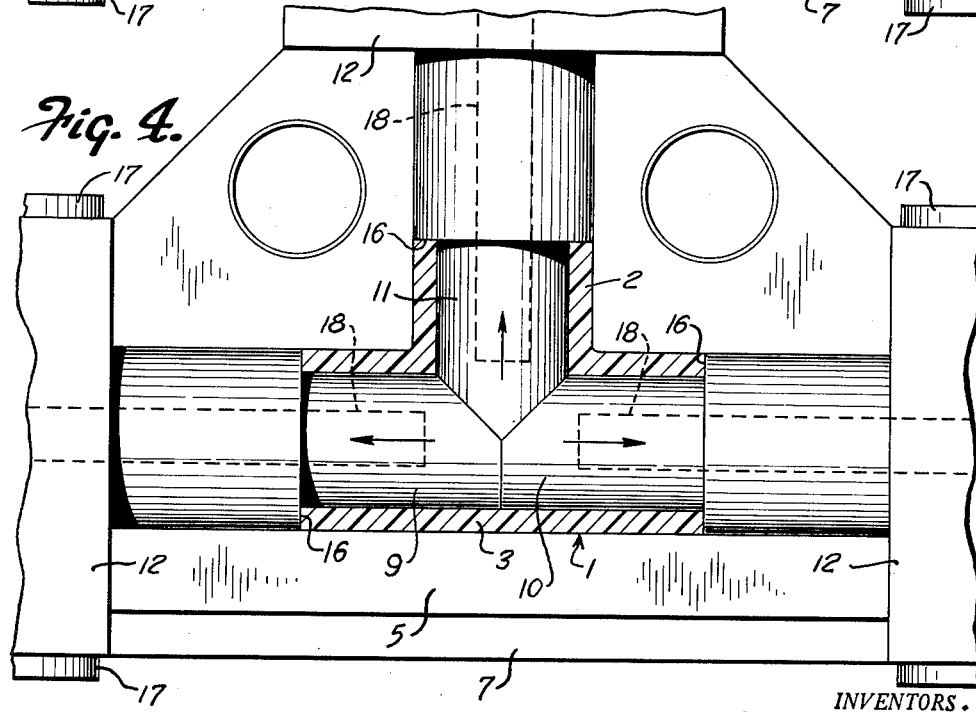

3,214,505
METHOD FOR COMPRESSION MOLDING OF MEMBERS
Harry Pierkowski, Menomonee Falls, Wis., and George A. Stein, Hopkins, Minn., assignors to A. O. Smith Corporation, Milwaukee, Wis., a corporation of New York
Filed Oct. 18, 1961, Ser. No. 145,794
4 Claims. (Cl. 264—294)

This invention relates to a method for compression molding of members having tubular portions and particularly non-symmetrical tubular members formed of fiber reinforced plastic and the like.

Plastic reinforced tubular members have been formed by the process of transfer molding wherein the molding compound is forced into a cavity including a core completely defining the shape of the member to be formed. The material is introduced through a suitable opening and flows about a core circumferentially of the tubular member. A knit line is formed where the opposing flow streams of the material join on the side opposite the introduction of the material. This results in an area of weakness and porosity in the member.

The formation of knit lines is particularly troublesome when employing glass reinforced plastic and the like. The glass fibers tend to roll in the front of the flowing material and when the opposing flow streams meet, there is no intertwining or meshing of the fibers. Consequently, fiber reinforcement is not provided in this area.

The present invention is directed to a method for compression molding tubular glass reinforced members and the like in an economical and rapid manner with a minimum of subsequent machining and processing.

In accordance with the present invention, a compression molding die is provided having a die cavity generally conforming to the outer configuration of the finished article. Movable pistons or mandrels are slidably mounted within the molding die for defining with the wall of the die cavity a compression molding cavity conforming to the shape of the member to be formed. The material from which the member is to be made is disposed within the die cavity as a solid mass of material and the mold closed. The pistons are then simultaneously moved into the die cavity and force the material into the compression molding cavity between the mandrels and the walls of the die cavity to form the member under compression. The mandrels and the die are heated prior to introduction of the molding compound and during the actual molding step to the curing temperature of the plastic.

The ends of the mandrels are formed to meet in a fully closed position and preferably to provide equal areas on their operating faces. This results in a minimal flash line area with resultant minimum post machining or processing required to provide a smooth interior surface of the member. Equal areas on the operating ends of the mandrels result in an equal back pressure providing better forming action.

High glass content reinforced plastic has a relatively large bulk factor. In accordance with the present invention, the raw material is premolded into a solid mass so that it can be introduced into the die cavity before the pistons are moved into the cavity. The premolded mass is inserted into the die cavity and formed by the compression molding process described above.

The present invention thus provides a means of molding tubular members such as pipe fittings without the usual knit or weld line and is particularly adapted for constructing such members from a plastic including a substantial quantity of reinforcing glass fibers.

The drawings furnished herewith illustrate the best mode presently contemplated for carrying out the invention.

In the drawings:
FIG. 1 is a perspective view of a T pipe fitting or joint;
FIG. 2 is a simplified perspective view of a molding apparatus for forming a T shown in FIG. 1;
FIG. 3 is an enlarged fragmentary horizontal section through the molding apparatus shown in FIG. 2; and
FIG. 4 is a horizontal view similar to FIG. 3 with the T completed.

Referring to the drawings and particularly to FIG. 1, a T 1 is shown including an open ended tubular portion 2 integrally joined and formed with a perpendicularly related tubular portion 3. The T 1 is formed of a glass fiber reinforced plastic having filamentary binding and strengthening elements.

Apparatus for forming of T 1 is shown in FIGS. 2–4 and includes an upper movable die 4 and a relatively stationary lower die 5 including recesses defining a cavity 6 generally conforming to the outer circumferential configuration of the T 1.

The lower die 5 is fixedly secured upon a supporting bed 7. The upper die 4 is fixed to the upper platen 8 of the press in alignment with the lower die 5 for controlled opening and closing of the cavity 6. Suitable means, not shown, are secured to the upper and lower dies 4 and 5 to heat the dies to a curing temperature for the plastic from which plastic T 1 is formed.

A pair of opposed mandrels 9 and 10 are slidably supported within the portion of the cavity 6 corresponding to the open ended tubular portion 3 of the T 1. Similarly, a mandrel 11 is perpendicularly related to the opposed mandrels 9 and 10 and adapted to move into the cavity corresponding to the perpendicularly related portion 2 of the T 1.

Each of the mandrels 9–11 is similarly mounted and corresponding elements are similarly numbered for simplicity and clarity of explanation. The mandrels 9–11 are slidably mounted within a bushing block 12 which is properly secured to the bed 7 and aligns the respective mandrels with the proper end portion of the cavity 6. A piston 13 projects outwardly from a cylinder 14 on the bed 7 in alignment with the respective mandrels 9–11 and is secured to the outer end of the corresponding mandrel as at 15. By actuation of the cylinder 14, the piston 13 and the attached mandrels 9–11 are moved into and out of the cavity 6 to define a subcavity corresponding to the shape of the T 1.

Each of the mandrels 9–11 includes a shoulder 16 to define the ends of the T 1 when the mandrels are moved into mating engagement as shown in FIGS. 2 and 3.

Electrical heating elements 17 are secured to the bushing blocks 12 and a cartridge heater 18 is inserted in each of the mandrels 9–11 generally centrally of the back portion thereof to increase the temperature of the mandrels and create rapid and effective curing of the material forming the T 1. Any other heating system may also be employed; for example, steam, hot oil or the like.

The opposed mandrels 9 and 10 have chamfered ends 19 in the closed position of the mandrels defining a generally triangular recess facing the mandrel 11. The mandrel 11 has a generally triangularly pointed end 20 corresponding to the recess formed by the chamfered ends 19.

In the closed position of the mandrels 9–11, they intermesh to completely correspond to the internal configuration of the T 1.

The chamfered ends 19 and 20 maintain equal end areas on each of the mandrels 9–11 and result in better forming action.

In carrying out the present invention, the mandrels 9–11 are retracted and the die cavity 6 opened by raising of the upper die 4. A preformed solid mass 21 having the general configuration of the final T 1 but somewhat smaller is disposed within the cavity portion 6 in the lower die 5.

The preformed mass 21 is a solid mass of the glass fiber reinforced plastic. As previously noted, the present invention is particularly directed to forming of the T of material having a relatively large bulk factor. Thus, where glass reinforced plastic is employed, the bulk factor may be seven to one or greater. In accordance with the present invention, the material is preformed generally to the configuration of the T 1 as shown. The present invention has been applied to forming a T from glass fiber reinforced plastic having a content of fifty percent glass fibers and a bulk factor of seven to one. The material was preformed to the coupling configuration with a bulk factor of three to one. Generally, in the preforming the mass is preferably heated to prevent expansion of the material as a result of its resiliency. The preformed mass may be partially cured depending on the curing agents in the compound and the final forming step should follow within a short period to assure optimum flow characteristics. Some compounds which preform readily at room temperature and have a long pot life at room temperature may be molded days or weeks after being preformed.

The upper die 4 is then moved down over the solid or the preformed mass 21 to complete cavity 6. Sufficient pressure is exerted so that the upper die 4 and lower die 5 will not separate when the mandrels 9–11 are moved into the die cavity. The cylinders 14 are actuated to move the piston 13 and the corresponding mandrels 9–11 into the die cavity 6 and thus into the preformed mass 21. The inward movement of the mandrels 9–11 force the preformed mass 21 into the space between the inner wall of the cavity 6 and the outer surface of the mandrels 9–11. The mass 21 is compressed and forced into the shape of the T 1. The dies 4 and 5 and the mandrels 9–11 are heated, as previously described, to a temperature suitable for curing of the plastic in the mass 21 to form a rigid and self-supporting T 1.

After a sufficient time to permit complete curing of the plastic, the mandrels 9–11 are retracted and the die 4 raised to allow removal of the T.

The resulting T 1 is produced without any weak knit line because there is no circumferential flow of opposing masses to form an interconnecting knit line. Consequently, a strong non-porous T is provided for interconnecting suitable conduits.

Various modes of carrying out the invention are contemplated as being within the scope of the following claims particularly pointing out and distinctly claiming the subject matter which is regarded as the invention.

We claim:

1. The method of molding tubular members having at least one pair of intersecting passageways and from a material having a large bulk factor, comprising the steps of preforming the material into a reduced general configuration of the molded member, disposing the preformed material into a mold cavity conforming to the configuration of the member, and simultaneously forcing a plurality of mandrel members into the mold cavity in accordance with the arrangement of the passageways to force the preformed material between the pistons and the wall defining the cavity and complete the member.

2. The method of molding tubular members having intersecting integral portions having internal corresponding intersecting passageways, said members being formed of a fiber reinforced thermoplastic material having a large bulk factor, comprising the steps of premolding the material into the general configuration of the member and smaller than the member, disposing the preformed material into a mold cavity conforming to the configuration of the member, simultaneously forcing a plurality of mandrel members corresponding to the configuration of the passageways into the mold cavity in accordance with the arrangement of the passageways to force the preformed member between the pistons and the wall defining the cavity to complete the member, and heating the thermoplastic material to cure and set the same.

3. The method of compression molding a tubular member from a glass reinforced plastic containing approximately fifty percent of glass fibers by volume and having a large bulk factor, comprising premolding the glass reinforced plastic into a solid member similar to and smaller than the outer configuration of the tubular member and thereby substantially reducing the bulk factor, heating of the premolded solid member to prevent expansion as a result of its resiliency, said member having curing compounds and a selected period of forming after said heating, disposing the premolded solid member in a mold cavity before the premolded solid member has cured sufficiently to adversely impair the flow characteristic thereof, and simultaneously forcing mandrel members having the contour corresponding to the inside of the tubular member into the mold cavity and into the premolded solid member to force the material into the space between the mandrel members and the wall defining the cavity.

4. The method of compression molding a T from a glass reinforced plastic containing approximately fifty percent of glass fibers by volume and having a bulk factor of the order of seven to one, comprising premolding the glass reinforced plastic into a solid T-shaped member to produce a bulk factor of three to one, disposing the premolded T-shaped member in a mold cavity of a mold before the premolded member has cured sufficiently to adversely impair or effect the flow characteristic of the material, simultaneously forcing three mandrel members having the contour corresponding to the inside of the T into the mold cavity and into the premolded T-shaped member to force the material into the space between the mandrel members and the wall defining the cavity, and heating the mold and the mandrel members to the cure temperature of the plastic prior to insertion of the premolded T-shaped member in the mold cavity.

References Cited by the Examiner

UNITED STATES PATENTS

| | | | |
|---|---|---|---|
| 1,826,944 | 10/31 | McKay et al. | 18—19 |
| 2,079,393 | 5/37 | Benge | 25—128 |
| 2,768,408 | 10/56 | Strigle et al. | 18—55 |
| 2,953,816 | 9/60 | Kidder | 18—55 |
| 2,954,583 | 10/60 | Gregory et al. | 18—16 |
| 3,048,891 | 8/62 | Maass | 18—45 |
| 3,049,756 | 8/62 | Gerard et al. | 18—16 |
| 3,092,441 | 6/63 | Bilderbeek | 18—42 |

ROBERT F. WHITE, *Primary Examiner.*

MICHAEL V. BRINDISI, *Examiner.*